No. 616,313. Patented Dec. 20, 1898.
A. GUASCO.
FORMALDEHYDE BURNER AND COMPOSITION OF MATTER FOR MAKING SAME.
(Application filed Jan. 20, 1898.)
(No Model.)
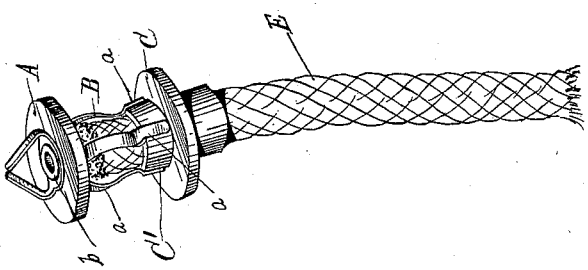
Witnesses.
J. C. Lebret.
O. Block.
Inventor.
André Guasco,
By H. A. de Vrs.
Attorney.

UNITED STATES PATENT OFFICE.

ANDRÉ GUASCO, OF PARIS, FRANCE.

FORMALDEHYDE-BURNER AND COMPOSITION OF MATTER FOR MAKING SAME.

SPECIFICATION forming part of Letters Patent No. 616,313, dated December 20, 1898.

Application filed January 20, 1898. Serial No. 667,218. (No model.)

*To all whom it may concern:*

Be it known that I, ANDRÉ GUASCO, a citizen of France, and a resident of Paris, France, have made certain Improvements in a Chemical Composition for Antiseptic Purposes and a Burner for Utilizing the Same, (for which I have obtained a patent in France, dated June 30, 1897, and numbered 268,337,) of which the following is a full and exact description, such as will enable others to make and use the same.

My invention has for its object to produce a composition for disinfecting or antiseptic purposes and a device for utilizing the same possessing certain advantages hereinafter specified; and the invention consists in the composition and device for use in connection therewith, which will be hereinafter fully described and then sought to be specifically defined by the claims.

In the drawing is illustrated a perspective of a burner for utilizing the new composition.

The characteristic property of platinum and of the metals of the same source, termed the "catalytic" property, consists in absorbing the gases, condensing them in their pores similarly to a mechanical compressor, and from this results an increase in temperature and the combustion of certain of them. This property, which is purely mechanical as far as the metal is concerned, occasions chemical reactions, a certain number of which are very important, among others those which relate to the decomposition of alcohols and to the production of aldehyde, which are capable of being utilized practically with advantage to the public health, owing to the property which they possess of assuring the disinfection of all contaminated spots. After endeavoring for a long time to utilize its remarkable property in different combinations I have succeeded in forming a composition with which the catalytic property of the metal may be developed in proportions hitherto unattainable. In this body it may be said that each metallic molecule fulfils not only the whole of its function, but the maximum of dehydrogenating power is obtained in such a manner that in cases in which it formerly required a gram of platinum, for example, to burn ten grams of alcohol the same result may be obtained with four milligrams.

It will readily be seen from the ratio of one to two hundred and fifty what results may be obtained from this product, the condensing property of which is considerably increased, not to mention other advantages enabling the production of industrial appliances of an improved action as compared with those for which platinum is employed.

In addition to the increase of the chemical dehydrogenating power it should be remembered that this novel composition, consisting principally of asbestos and of metal under the special conditions hereinafter defined, comes under the category of refractory bodies, the calorific properties of which are diametrically opposed to those of the metals. The consequences of this refractory condition are multiple. Thus in the principal case with which we are now concerned (that of the combustion of alcohol) the active substance having been raised to a red heat is very readily maintained at this temperature not only on account of the greater energy of the chemical combination, but also because it conserves the heat, contrary to what is the case with metals which radiate it with the greatest facility.

This novel product differs, essentially, from the sponge or black either of platinum or of palladium by the following properties: first, bad conductibility of heat; second, more complete dehydrogenation; third, impossibility of acting in a cold state, either in the presence of hydrogen or of any other gas, and, fourth, impossibility under normal conditions of the inflammation of the decomposed bodies. These properties are the exact opposite of those of the sponge of either platinum or palladium, which is ordinarily employed in the different devices used for heating a platinum wire and igniting in a cold state the gas issuing from burners for lighting purposes.

The application of such devices adapted for the combustion of alcohol may be attended with danger if such application is capable, as is the case with alcohol at 100°, of effecting the spontaneous ignition of the liquid and of causing a fire, according to the spot at which the burner is situated. On the other hand, active chemical plates brought into the presence of highly-hydrated alcohol at 70°, for example, effect the combustion regularly with a liberation of steam, while with metal this result cannot be obtained, owing to the rapid cooling occasioned by the condensation of this steam upon the metallic surface. Only alcohol having at least 96°, which is high in price, can be utilized.

With the chemical product all commercial alcohols for burning may be employed. In addition this novel product gives, in combination with alcohol, aldehydes and very little acid, which is the reverse of what takes place with the application of platinum, which gives a considerable quantity of acid and but a small quantity of aldehydes.

In order to obtain this novel chemical product, it is necessary in principle to treat asbestos with acid solutions in order to provoke swelling without occasioning disaggregation, and thus obtain the maximum of volume and of porosity. All that is necessary in order to effect this is to treat the prepared pieces with a dilute solution of hydrochloric acid at ten per cent. and subsequently bake them in a reverberatory furnace. Second operation: Prepare a solution containing water, ten thousand grams; chlorid of platinum, three hundred grams; sulfate of magnesia, three hundred grams; pipe-clay, two hundred grams; white sugar, five hundred grams; cyanid of palladium, one gram; Mix thoroughly, decant, and filter. Immerse the plates of asbestos or any other porous refractory body. Allow them to absorb until the point of saturation and dry and bake in a reverberatory furnace. The plates thus formed are arranged so as to form the antiseptic burner, as indicated in the accompanying drawing, in which—

The letter A designates a disk formed of a combination of asbestos and platinum or their equivalents and which is mounted upon a frame consisting of the prongs $a$, which at their upper ends are joined together and at their lower ends clamp or clasp a ring or tube $C'$, to which is secured a washer C, adapted to rest upon the mouth of any suitable reservoir for containing alcohol. The disk A rests upon the top of the frame B and is secured thereto by a hollow eyelet $b$, which also clamps to the disk A a finger-plate D, by which disk A can be lifted without liability of breaking.

A wick E leads from the alcohol-reservoir and passes through the ring or tube $C'$ and terminates beneath the top of the prongs $a$ and the eyelet which secures the disk A to the prongs. The prongs and eyelet being of non-absorbent material or substance—such, for instance, as any suitable metal—will prevent the alcohol being conducted from the wick directly to the disk A, and yet will permit the heat from the disk A to be transmitted to the wick, so that the transmitted heat will be utilized to produce evaporation of the alcohol in sufficient quantity to maintain incandescence.

What I claim is—

1. The composition for antiseptic purposes composed of a porous refractory body having incorporated therewith a mixture of chlorid of platinum, sulfate of magnesia, clay, sugar, and cyanid of palladium, substantially as and for the purposes described.

2. The antiseptic burner comprising a composition of porous refractory substance having incorporated therewith a mixture of chlorid of platinum, sulfate of magnesia, clay, sugar, and cyanid of palladium, an alcohol-feeder, and a non-absorbent material between said feeder and said composition, substantially as and for the purposes described.

In testimony that I claim the foregoing I have hereunto set my hand this 28th day of December, 1897.

ANDRÉ GUASCO.

Witnesses:
EDWARD P. MACLEAN,
VICTOR MATRAY.